United States Patent
Nagar et al.

(10) Patent No.: US 9,280,206 B2
(45) Date of Patent: Mar. 8, 2016

(54) SYSTEM AND METHOD FOR PERCEIVING IMAGES WITH MULTIMODAL FEEDBACK

(71) Applicant: Samsung Electronics Co., LTD, Suwon-si, Gyeonggi-do (KR)

(72) Inventors: Abhishek Nagar, Garland, TX (US); Kaushik Josiam, Dallas, TX (US); Andrew Dickerson, Allen, TX (US); Timothy Thompson, Wylie, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 124 days.

(21) Appl. No.: 13/954,523

(22) Filed: Jul. 30, 2013

(65) Prior Publication Data

US 2014/0049491 A1 Feb. 20, 2014

Related U.S. Application Data

(60) Provisional application No. 61/691,135, filed on Aug. 20, 2012, provisional application No. 61/709,870, filed on Oct. 4, 2012.

(51) Int. Cl.
G06F 3/16 (2006.01)
G06F 3/01 (2006.01)
G06F 3/0488 (2013.01)

(52) U.S. Cl.
CPC ............ *G06F 3/016* (2013.01); *G06F 3/0488* (2013.01)

(58) Field of Classification Search
CPC ............................. G06F 3/016; G06F 3/0488
USPC ........................................................ 345/173
See application file for complete search history.

(56) References Cited

U.S. PATENT DOCUMENTS

| 2008/0024459 A1* | 1/2008 | Poupyrev et al. ............. 345/173 |
| 2009/0167508 A1* | 7/2009 | Fadell et al. ................ 340/407.2 |
| 2009/0167701 A1 | 7/2009 | Ronkainen |
| 2009/0207175 A1* | 8/2009 | Warner ........................ 345/473 |
| 2009/0305744 A1* | 12/2009 | Ullrich ........................ 455/567 |
| 2010/0231550 A1* | 9/2010 | Cruz-Hernandez et al. .. 345/174 |

(Continued)

FOREIGN PATENT DOCUMENTS

WO    WO 00/73974 A1    12/2000

OTHER PUBLICATIONS

International Search Report dated Nov. 28, 2013 in connection with International Patent Application No. PCT/KR2013/007406, 3 pages.

(Continued)

*Primary Examiner* — Ariel Balaoing

(57) ABSTRACT

A method, system and computer-readable medium for providing feedback effects for an image. The method includes identifying one or more features in an area of the image. The method also includes mapping the one or more identified features to at least one of multiple modalities of feedback effects. Additionally, the method includes generating parameters for feedback effect output and storing the generated parameters in association with the image such that, in response to coordinates of an input of a user corresponding to the area of the image, a user interface associated with the image is configured to provide at least one of the multiple modalities of feedback effects to the user. The multiple modalities of feedback effects include one or more visual feedback effects, one or more haptic feedback effects and one or more audio feedback effects.

20 Claims, 8 Drawing Sheets

(56) References Cited

U.S. PATENT DOCUMENTS

| | | |
|---|---|---|
| 2011/0021272 A1 | 1/2011 | Grant et al. |
| 2011/0072012 A1 | 3/2011 | Ah-Pine et al. |
| 2011/0267181 A1 | 11/2011 | Kildal |
| 2011/0285666 A1 | 11/2011 | Poupyrev et al. |
| 2011/0316769 A1* | 12/2011 | Boettcher et al. ............. 345/156 |
| 2012/0033863 A1 | 2/2012 | Wojton et al. |
| 2013/0038576 A1* | 2/2013 | Chen et al. .................... 345/175 |
| 2014/0002346 A1* | 1/2014 | Weddle et al. ................ 345/156 |

OTHER PUBLICATIONS

Written Opinion of International Searching Authority dated Nov. 28, 2013 in connection with International Patent Application No. PCT/KR2013/007406, 5 pages.

Extended European Search Report dated Jan. 8, 2016 in connection with European Patent Application No. 13831743.3, 7 pages.

\* cited by examiner

SYSTEM AND METHOD FOR PERCEIVING IMAGES WITH MULTIMODAL FEEDBACK

CROSS-REFERENCE TO RELATED APPLICATION(S) AND CLAIM OF PRIORITY

The present application claims priority to U.S. Provisional Patent Application Ser. No. 61/691,135 filed Aug. 20, 2012, entitled "LIVE IMAGES: A FRAMEWORK FOR PERCEIVING IMAGES WITH MULTIMODAL FEEDBACK" and U.S. Provisional Patent Application Ser. No. 61/709,870 filed Oct. 4, 2012, entitled "LIVE IMAGES: A FRAMEWORK FOR PERCEIVING IMAGES WITH MULTIMODAL FEEDBACK". The content of the above-identified patent documents is incorporated herein by reference.

TECHNICAL FIELD

The present application relates generally to image perception and, more specifically, to perceiving images with multimodal feedback.

BACKGROUND

Images, such as pictures, graphics, and backgrounds, are generally only perceived on a user interface of an electronic device through the viewing of a static image. An increasing numbers of consumer electronic devices in use today now include touch-screens, speakers, and the ability to provide haptic feedback. Haptic feedback is feedback provided to a user through the sense of touch that uses movement, such as vibrations or motions.

Accordingly, there is a need for enhancing image perception through the use of multimodal feedback.

SUMMARY

Embodiments of the present disclosure provide a system and method for perceiving images with multimodal feedback.

In one embodiment, a method for providing feedback effects for an image is provided. The method includes identifying one or more features in an area of the image. The method also includes mapping one or more identified features to at least one of multiple modalities of feedback effects. Additionally, the method includes generating parameters for feedback effect output and storing the generated parameters in association with the image such that, in response to coordinates of an input of a user corresponding to the area of the image, a user interface associated with the image is configured to provide at least one of the multiple modalities of feedback effects to the user. The multiple modalities of feedback effects include one or more visual feedback effects, one or more haptic feedback effects, and one or more audio feedback effects.

In another embodiment, a system for providing feedback effects for an image is provided. The system includes at least one processor and at least one storage device configured to store program code. The processor is configured to execute the program code to identify one or more features in an area of the image; map the one or more identified features to at least one of multiple modalities of feedback effects; and generate parameters for feedback effect output and store the generated parameters in association with the image such that, in response to coordinates of an input of a user corresponding to the area of the image, a user interface associated with the image is configured to provide at least one of the multiple modalities of feedback effects to the user.

In yet another embodiment, a non-transitory computer-readable medium embodying program code for providing feedback effects for an image is provided. The computer-readable medium includes program code for identifying one or more features in an area of the image. The computer-readable medium also includes program code for mapping the one or more identified features to at least one of multiple modalities of feedback effects. Additionally, the computer-readable medium includes program code for generating parameters for feedback effect output and storing the generated parameters in association with the image such that, in response to coordinates of an input of a user corresponding to the area of the image, a user interface associated with the image is configured to provide at least one of the multiple modalities of feedback effects to the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
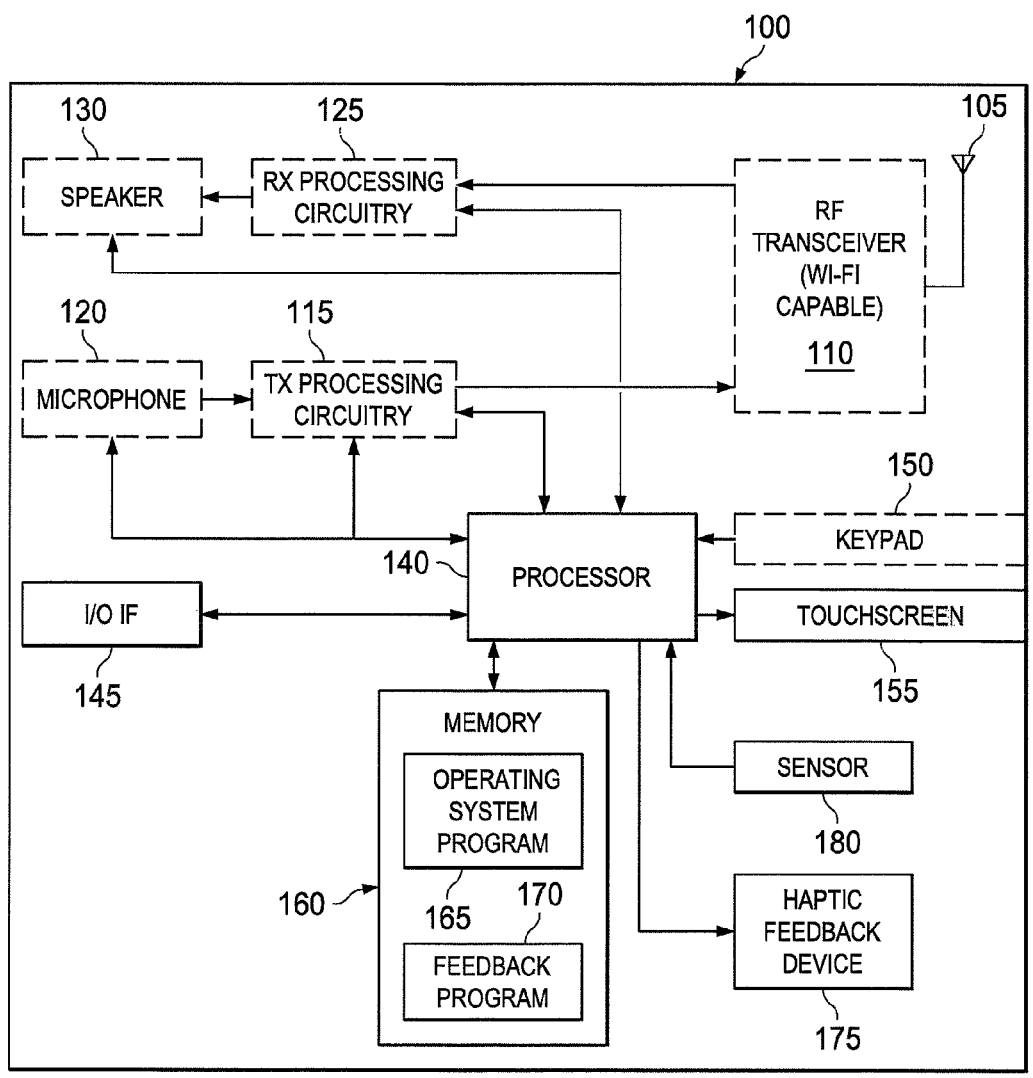
FIG. 1 illustrates an electronic device which may be used in implementing various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure recognize that haptic feedback can provide increased productivity, especially, for example, in noisy environments. Various embodiments of the present disclosure also recognize that haptic feedback can be extended into the context of visual content, such as images to communicate an immersive sensory experience. An image preserves current sensory experience in a visual medium that enables recall of the experience when desired. However, the aural, touch and other sensory content in the scene are discarded in this process. Some portion of the sensory experience may be recreated when viewing the image by a focused application of visual, audio and haptic effects. For example, embodiments of the present disclosure recognize the intensity of haptic feedback based on the shape of the probe, speed with which the user is moving the probe across the virtual surface and the shape of the virtual surface. Embodiments of the present disclosure recognize that limitations of existing approaches to incorporate haptic feedback on images include a lack of simultaneously incorporating visual and audio effects in addition to haptic and a lack of user study in order to evaluate effectiveness of different types of haptic feedback incorporation.

Various embodiments of the present disclosure also recognize that audio feedback can enhance image perception. For example, audio feedback involves systems that generate specific sounds when the user is touching a specific kind of texture on screen. Embodiments of the present disclosure recognize that limitations of such systems are the computational complexity involved. For example, computational complexity may limit the variety of sounds generated. Various embodiments of the present disclosure also recognize that visual feedback involves approaches that involve modification in the visual content to improve image perception. Embodiments of the present disclosure recognize that visual feedback systems, like haptic and audio, may require extensive manual intervention.

Accordingly, embodiments of the present disclosure provide harmonization of audio, visual, haptic and other sensory effects to provide desirable (e.g., natural and/or appealing) sensory feedback to the user viewing an image and/or using applications associated with a displayed image. Various embodiments provide audio, visual and haptic feedback, beyond the normal viewing of the images using, for example, a touch-sensitive display unit, to the user while the user touches different portions of the image. Audio effects involve playing a specific sound while the user is touching or moving his finger upon a specific region of the image. Haptic effects, also referred to as tactile feedback, involve play of a synthesized tactile feedback while the user is touching or moving his finger upon a specific region of the image. An example of a tactile feedback is the on-off sequence of haptic vibration commonly available on handheld devices. There, different vibration sequences having different on-off patterns elicit different sensory response to the user experiencing the vibration. Visual effects, on the other hand, modify the visual content, for example, by changing the color and intensity of the image region marking the neighborhood of the point where the user is touching the image. These three types of feedback, and possibly other types, are methodically chosen, and their parameters are conditioned on a variety of factors, such as user profile, type of device, etc. to enhance the sensory perception of the image content.

FIG. 1 below describes various embodiments implemented in an electronic device 100. The description of FIG. 1 is not meant to imply physical or architectural limitations to the manner in which different embodiments may be implemented. Different embodiments of the present disclosure may be implemented in any suitably arranged system or device.

FIG. 1 illustrates an electronic device 100 which may be used in implementing various embodiments of the present disclosure. For example, in some embodiments, the electronic device 100 may be a touch-screen enabled device that provides audio, visual and/or haptic feedback associated with an image to a user of the electronic device 100. In some embodiments, the electronic device 100 may identify features of an image and generate parameters for audio, visual and/or haptic feedback to be provided with the image. For example, without limitation, the electronic device 100 may be a server computer, personal computer, laptop computer, tablet computer, mobile phone, personal digital assistant, television, etc.

In this illustrative embodiment, the electronic device 100 includes an antenna 105, a radio frequency (RF) transceiver 110, transmit (TX) processing circuitry 115, a microphone 120, and receive (RX) processing circuitry 125. Electronic device 100 also comprises speaker 130, processor 140, input/output (I/O) interface (IF) 145, keypad 150, touchscreen 155, and memory 160. Memory 160 further comprises basic operating system (OS) program 165.

In an advantageous embodiment of the present disclosure, processor 140 is a microprocessor or microcontroller. Memory 160 is coupled to processor 140. According to an advantageous embodiment of the present disclosure, part of memory 160 comprises a random access memory (RAM), and another part of memory 160 comprises a non-volatile memory, such as Flash memory, which acts as a read-only memory (ROM).

Processor 140 executes basic operating system (OS) program 165 stored in memory 160 in order to control the overall operation of electronic device 100. In one such operation, processor 140 controls the reception of forward channel signals and the transmission of reverse channel signals by radio frequency transceiver 110, receiver processing circuitry 125 and transmitter processing circuitry 115 in accordance with well-known principles.

In this illustrative embodiment, the electronic device 100 also comprises speaker 130, processor 140, input/output (I/O) interface (IF) 145, keypad 150, touchscreen 155 and memory 160. Memory 160 further comprises an operating system (OS) program 165.

Processor 140 is capable of executing other processes and programs resident in memory 160. In various embodiments, the processor 140 executes program code of the feedback program 170 to generate and/or provide audio, visual and/or haptic feedback for images. Processor 140 can move data into or out of memory 160, as required by an executing process. Processor 140 is also coupled to input/output (I/O) interface 145. I/O interface 145 provides electronic device 100 with the ability to connect to other devices, such as laptop computers and handheld computers. I/O interface 145 is the communication path between these accessories and processor 140.

Processor 140 is also coupled to keypad 150 and touchscreen 155. In some embodiments, the user of electronic device 100 may use a keypad 150 to enter data into electronic device 100. In other embodiments, the electronic device 100 may use a touchscreen to receive user inputs. For example, the touchscreen 155 may include both a display and a touch plate, such as, for example, a resistive or capacitive touch plate. The display in the touchscreen 155 may be, for example, a liquid crystal display, a light emitting diode display and/or an organic light emitting diode display capable of rendering text and/or at least limited graphics from web sites. Alternate embodiments may use other types of displays.

The haptic feedback device 175 is a device that provides haptic feedback. For example, the haptic feedback device 175 may include a motor to generate motion and/or vibrations of the electronic device 100 to provide haptic feedback to a user of the electronic device 100. The sensor 180 is a sensor that senses conditions of the environment where the electronic device 100 is located. For example, without limitation, the sensor 180 may be a proximity sensor, light sensor or other type of sensor for sensing conditions of the environment where the electronic device 100 is located. In various embodiments, the electronic device 100 may use the sensor 180 in determining constraints on the types of feedback to provide with an image.

The illustration of the electronic device 100 and components contained therein is exemplary and not intended to place any physical or architectural limitations on the various embodiments that may be implemented in accordance with the principals of the present disclosure. For example, depending on the type of electronic device needed, embodiments of the electronic device 100 may not include all the components illustrated in FIG. 1. For example, a computer, such as a personal computer or server computer, may communicate over a wired connection using a local area network connection and card but may not include wireless communication elements, such as, for example, the antenna 105, the radio frequency (RF) transceiver 110, transmit (TX) processing circuitry 115, microphone 120 and/or receive (RX) processing circuitry 125. In various embodiments, the electronic device 100 may receive cursor inputs from the user using a mouse, or the electronic device 100 may not include the keypad 150. In other embodiments, when the electronic device 100 only generates parameters for audio, visual and/or haptic feedback for images, the electronic device 100 may not include the sensor 180 and/or the haptic feedback device 175. In other embodiments, the electronic device 100 displaying the image may have physical constraints on types of feedback that can be provided. For example, in such embodiments, the electronic device 100 may not include the haptic feedback device 175, may not be touch-screen enabled or may not include a speaker 130.

Figure 2:
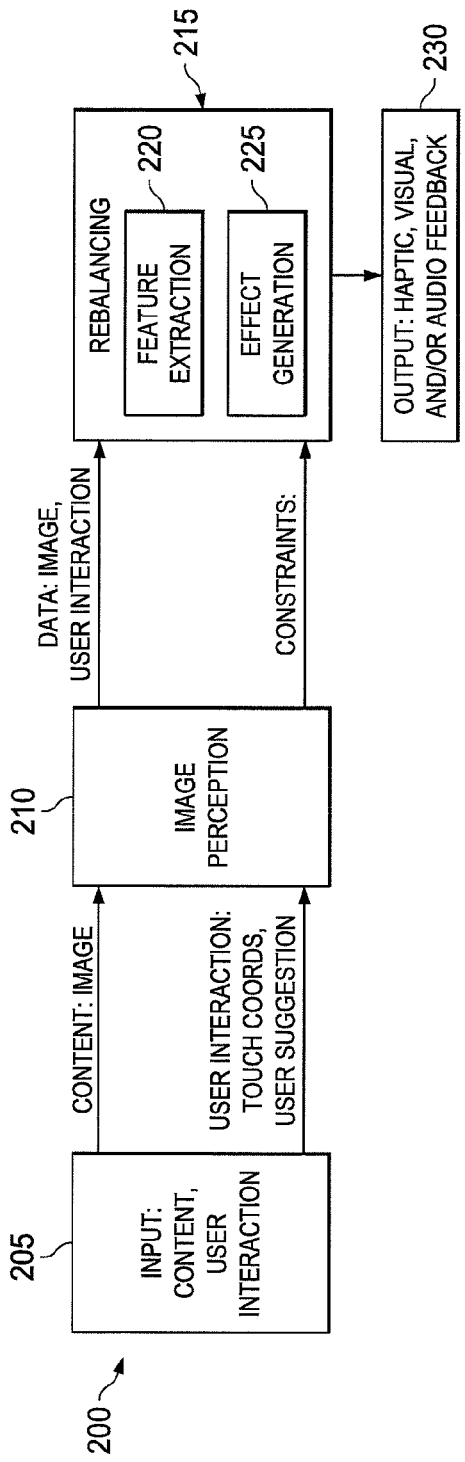
FIG. 2 illustrates a system for generating feedback effects for an image in accordance with various embodiments of the present disclosure.

FIG. 2 illustrates a system 200 for generating feedback effects for an image in accordance with various embodiments of the present disclosure. In this illustrative embodiment, the system 200 generates feedback effects for an image through a mapping between feature extraction and feedback effect. The system 200 may be implemented, for example, by the electronic device 100 and the feedback program 170 in FIG. 1.

In this illustrative embodiment, the system 200 provides the application and harmonization of audio, visual, haptic and other sensory effects to provide desirable (e.g., natural and/or appealing) sensory feedback to the user. The system 200 includes an input module 205 for receiving inputs, such as content and user interactions. The input content may include images, such as graphics, pictures, backgrounds, etc. The input user interaction may include coordinates of a user touch input to a touchscreen or coordinates of a cursor or pointer input using a mouse. The system 200 includes an image perception module 210 for identifying an ideal perception for determining an ideal perception of the image to provide simulations of the observer being actually present in the scene present in the image displayed. The system 200 also includes a rebalancing module 215 to enable the new desired perception of the image using a mapping between image feature extraction and feedback effect. To enable the desired perception, the rebalancing module 215 includes a feature extraction module 220 and an effect generation module 225.

In various embodiments, the feature extraction module 220 identifies and/or extracts various image texture features from the image, as will be discussed in greater detail below. Examples of such features include Tamura texture features, local gradient vectors, etc. The features extracted using the feature extraction module 220 are expected to measure certain local image characteristics that should be used to estimate the parameters of the effects to be provided with the image. In other examples, the feature extraction module 220 may recognize elements of the scene (e.g. grass, trees, people, etc.) and may include utilization of a local- or cloud-based object recognition system.

In various embodiments, the effect generation module 225 identifies the image features extracted by the feature extraction module, the image itself and the way the user is interacting with the device (e.g. the x- and y-coordinates of the location where the user is touching the device or a cursor input is detected) and generates sensory feedback that may include audio, visual and haptic effects on the image. The various audio, visual and haptic effects capable of being provided by the effect generation module 225 are discussed in greater detail below. The visual effects modify, in some manner, the image being displayed, while the audio and haptic effects are played and/or provided directly by the device displaying the image.

The rebalancing module 215 thereafter maps the various effects to applicable areas of the image and generates output parameters 230 for providing the effects with the image. For example, the output parameters 230 may be instructions for providing the effect stored in a library of effects for the image that are mapped to different areas of an image. When user provides input coordinates, the system 200 identifies the mapping between the output parameters 230 from the library and the area corresponding to the user input coordinates. The identified output parameters 230 are retrieved and processed to provide the desired feedback effects.

Figure 3:
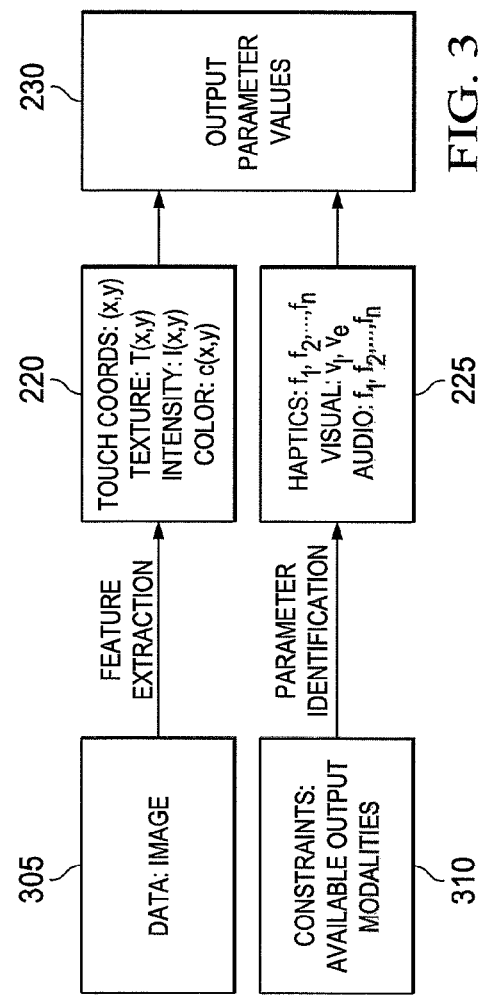
FIG. 3 illustrates an exemplary embodiment of the rebalancing module in the system illustrated in FIG. 2.

FIG. 3 illustrates an exemplary embodiment of the rebalancing module 215 in the system 200 in FIG. 2. In various embodiments, the feature extraction module 220 receives input data 305, (e.g., an image) and extracts and/or identifies features of the image, such as, for example, texture, intensity, color and/or user interaction with an image, such as a touch or cursor input. In these embodiments, the feature extraction module 220 may extract image features using a number of techniques including co-occurrence matrices, Markov random fields, Gabor texture features and Tamura features. Additional techniques for texture feature extraction are described, for example, in "The Handbook Pattern Recognition and Computer Vision" and particularly chapter 2.1 in "Texture Analysis" by Tuceryan, M., and Jain, A. K., C. Chen, L. Pau, and P. Wang, World Scientific Publishing Co., 1998, which is incorporated by reference herein. While the co-occurrence matrices, Markov random fields and Gabor texture features are mainly used to classify textures, it may be difficult to infer or visualize the kind of texture given the values for these measures. Tamura texture features, on the other hand, specifically provide a meaning to the different features. Six Tamura features include: coarseness, contrast, directionality, line likeness, regularity and roughness and are described in greater detail in the article entitled "Texture features corresponding to visual perception" by H. Tamura, S. Mori, and T. Yamawaki in IEEE Transactions on Systems, Man, and Cybernetics, vol. SMC-8, no. 6, 1978, 460-473, which is incorporated by reference herein.

Coarseness essentially quantifies the size of texture elements in the image. The larger the elements in a texture, the coarser it is. As an example, an image of larger stones is coarser than an image of smaller stones. Note that a magnified version of an image will have a larger coarseness value compared to the original image. Contrast essentially measures the range of intensity values locally present in an image. As an example, an image of a black/white checkerboard will have higher contrast than an image of the sky. Directionality quantifies the number of different directions in which there are dominant gradients. As an example, an image of window blinds is more directional than an image of stones. Line likeness measures the amount of thin lines present in the image. As an example, an image of wire mesh is more line likely than an image of stones. Regularity measures how regularly the texture elements are placed. As an example, an image of layered bricks is more regular than an image of grass. Roughness is derived as the sum of coarseness and contrast values. It measures how rough the texture is perceived. In addition to Tamura features, the feature extraction module 220 may use image gradients computed using the Sobel operator to classify the touched location into one of the many predetermined categories. The category of the local texture is, in turn, used to determine the audio, visual and haptic effects to be played.

Figure 6:
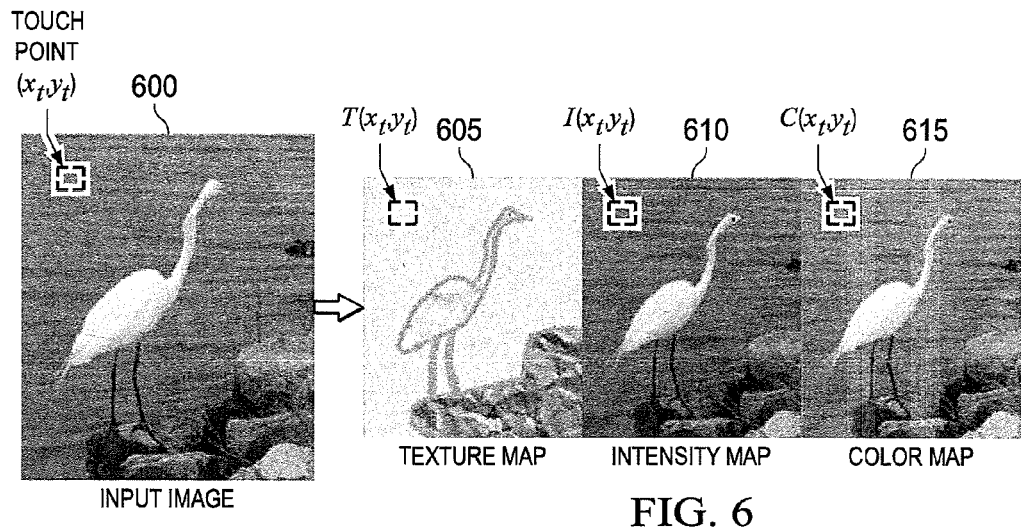
FIG. 6 illustrates one example of an input image extracted into a texture map, an intensity map and a color map in accordance with an illustrative embodiment of the present disclosure.

In other examples, the feature extraction module 220 may also identify values for intensity and color of the image to use as identified features for feedback effect mapping. For example, FIG. 6 illustrates one example of an input image 600 extracted into a texture map 605, an intensity map 610 and a color map 615 in accordance with an illustrative embodiment of the present disclosure. In this illustrative example, the feature extraction module 220 may identify values for texture, intensity and/or color for various points in the image 600, and feedback effects may be mapped to one or more of the texture, intensity and color of the image. For example, the feature extraction module 220 may identify a range of values for the texture, intensity and/or color and for the rebalancing module 215 to map a corresponding range of sounds, visual effects and/or haptic effects (e.g., vibration frequency or intensity).

Figure 4:
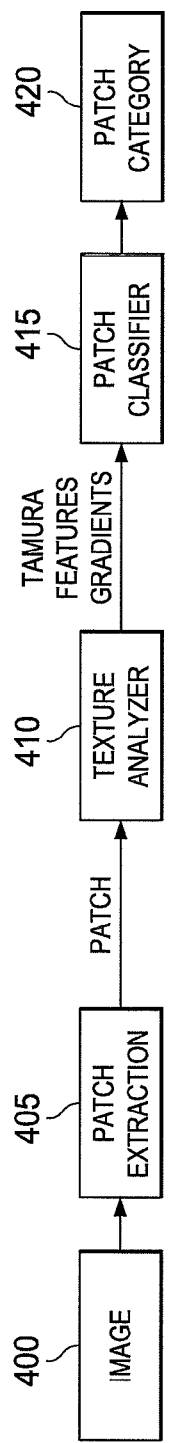
FIG. 4 illustrates a flow diagram for a process of categorizing image patches based on underlying texture values in accordance with various embodiments of the present disclosure.

In some embodiments, the system 200 may categorize image regions, patches or areas based on the underlying texture, intensity and/or color values and map the parameters of the visual, haptic and audio effects to each of the categorized image regions, patches or areas. For example, FIG. 4 illustrates a flow diagram for a process of categorizing image patches based on underlying texture values in accordance with various embodiments of the present disclosure. In this illustrative embodiment, the system 200 receives an image (step 400) and segments the image into a number of regions, patches or areas (step 405). The system 200 then analyzes the texture of points or pixels of each patch (step 410). For example, the system 200 may extract Tamura features to identify gradients within the image. The system 200 then classifies each patch based on the extracted features (step 415). For example, the system 200 may classify features in the patch using image gradients computed to classify the touched location into predetermined categories. Thereafter, the system 200 categorizes each of the patches in the image (step 420). For example, the system 200 may categorize the patch amongst various levels for most and least Tamura features, such as, for example, coarseness, contrast, directionality, line likeness, regularity and roughness. The category of the patch is, in turn, used to determine the audio, visual and haptic effects to be played and/or associated with user inputs for that patch.

Figure 5:
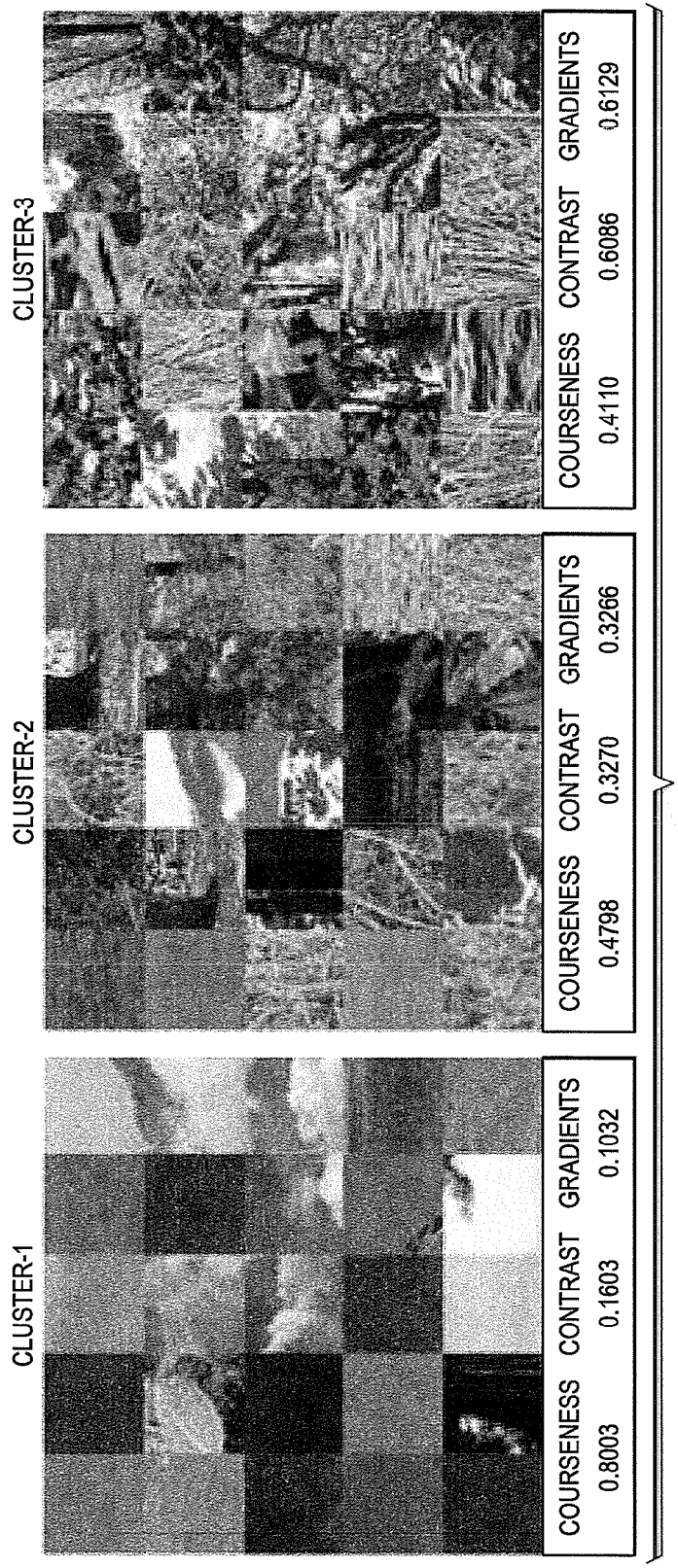
FIG. 5 illustrates patches from different clusters categorized according to average values for coarseness, contrast and gradients in accordance with an illustrative embodiment of the present disclosure.

FIG. 5 illustrates patches from different clusters categorized according to average values for coarseness, contrast and gradients in accordance with an illustrative embodiment of the present disclosure. In this illustrative embodiment, the system 200 extracts coarseness, contrast and local gradient magnitude from a pool of texture patches (e.g., a size of 50×50) and clusters the patches using K-means clustering to generate a set of k different clusters.

After identifying the features of the image, the system 200 assigns, generates and/or maps one or more feedback effects to the identified features of the image. In various embodiments, these feedback effects include at least three types: audio, visual and haptic. The visual effects used in various embodiments of the present disclosure may include three different types: displacement effects, illumination effects and blur effects.

The displacement effect involves displacement of certain regions in the image as the user touches the regions. This effect simulates a physical object present in the scene that responds to the touch by moving. An example of the displacement effect is the Ripple effect described in greater detail below. The illumination effect, on the other hand, simulates a light source used to highlight certain regions in the image. The light source could have a specific set of colors with different intensities for different wavelengths of colors. An example of the illumination effect is the Glow effect described in greater detail below. The third category of visual effect involves blurring of certain regions of the image which essentially highlights the limitation of human perception when viewing a fast moving object, especially when the object is not in focus. An example of the blur effect is the motion-blur effect described in greater detail below. Note that these effects are complementary to each other and can be played or provided on top of each other or at the same time.

Figure 8A:
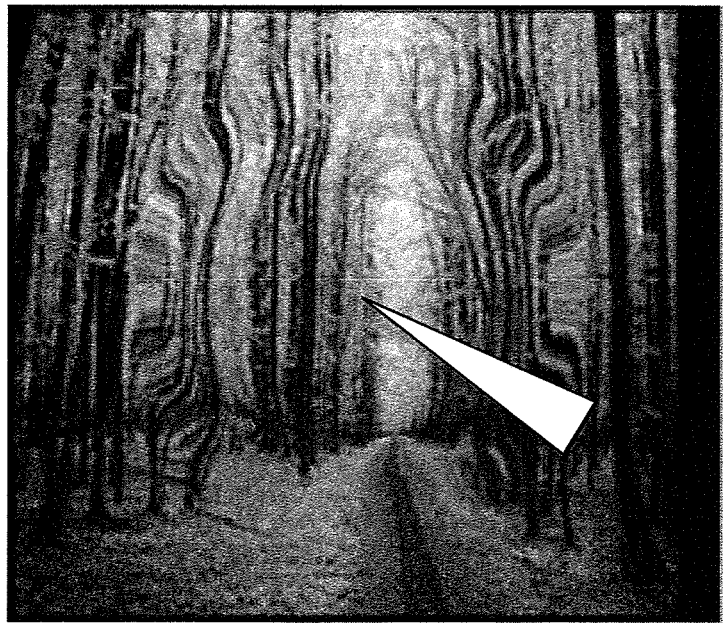
FIG. 8A illustrates a ripple effect in an image in accordance with an illustrative embodiment of the present disclosure.

FIG. 8A illustrates a ripple effect in an image in accordance with an illustrative embodiment of the present disclosure. As illustrated, the ripple effect simulates a scenario where water is spread over the screen, and the user is touching the water surface. Here, the location of each pixel may be updated based on the height of water at that location. In each frame, the height of water at a particular point is determined using the height of water at that point as well as neighboring points from the previous two frames. Once the user touches the screen, the height of the water in the image frame displayed at that instant in the neighboring region of the touch point is raised to a specific level. Due to the dependence of the effect on the previous frames, the effect keeps playing in the subsequent frames, and a sense of a ripple flowing on the image is perceived. There are two parameters to modulate this effect, the damping parameter and the size of the circular neighborhood in which the height of the water is affected when a user touches the image. The dampening parameter essentially simulates the viscosity of the fluid being simulated. If the value of the dampening parameter is low, the ripples die out very quickly indicating that the viscosity of the fluid is perceived to be very high. On the other hand, if the value of the dampening parameter is the maximum possible (i.e., 1), the ripples do not stop.

Figure 8B:
FIG. 8B illustrates a glow effect in an image in accordance with an illustrative embodiment of the present disclosure.

FIG. 8B illustrates a glow effect in an image in accordance with an illustrative embodiment of the present disclosure. In this illustrative example, the region around the location at which the user is currently touching the surface is modified based on the parameters of the effect. Unlike the ripple effect, this effect is an instant effect. This means that as soon as the user changes the location at which the user is touching the screen, the effect also moves accordingly. In our current implementation, a glow-like effect is generated which increases the intensity component of the color values associated with the image being displayed. If the RGB color values of the image at a specific point (x, y) are r, g, and b, respectively, the updated color values may be computed according to Equation 1 below:

$$r(x,y)=\min(r(x,y)+(X-D(x,y))/(X)*F,R_{MAX})$$

$$g(x,y)=\min(g(x,y)+(X-D(x,y))/(X)*F,G_{MAX})$$

$$b(x,y)=\min(b(x,y)+(X-D(x,y))/(X)*F,B_{MAX})$$

$$\forall D(x,y) \leq X \quad \text{[Equation 1]}$$

where X is the parameter used to modulate the size of the image region affected by this effect, D is the Euclidean distance of the current pixel considered from the location of the touch point and F is the parameter to modulate the intensity of the effect. The constants $R_{MAX}$, $G_{MAX}$, and $B_{MAX}$ indicate the maximum value allowed for the red, green and blue colors.

Figure 8C:
FIG. 8C illustrates a motion blur effect in an image in accordance with an illustrative embodiment of the present disclosure.

FIG. 8C illustrates a motion blur effect in an image in accordance with an illustrative embodiment of the present disclosure. The motion effect simulates a scenario where the user is moving his finger across the image, and the image is locally blurred in the regions where the user is touching the image. The direction of blur is the same as the direction in which the user is moving his/her finger. Similar to the glow effect, this effect is local and temporary, i.e. the blur appears only in a region of certain radius in which the value can be tuned as a parameter of the effect around the point where the user touches the screen. Given that the user is currently touching at point $(T_x, T_y)$, and the velocity with which the user is moving his/her finger is $(V_x, V_y)$, the effect performs a weighted average of the pixel values of the seven neighboring pixels including itself. This parameter of value seven is exemplary; other values may be used. One parameter used to modulate this motion blur effect is the size of the effect that determines the distances of the selected neighboring points from the touch point. Another parameter of the motion blur effect is the region around the touch point in which the color values are affected as a result of this effect.

Additional non-limiting examples of visual effects that may be used similarly to the ones described above include: 3D mesh rendering; spotlight; color shifting; mesh explode polygons; point light; Sepia tone; water ripple; directional light; len vignette; water fill; per pixel lighting; metal, rubber or wood shading; fish eye; shadows; bump mapping; lightning; fire; fur; smoke; fireball; dilation; fog; water paint; erosion; magnifying glass; ephemeral curtain; sharpen; snow particles; glow; emboss; pixie dust; bloom; black and white; cherry blossom particles; heat wave; cross hatch; other particle effects; sine waves; cartoon shading; reflection; thermal vision (predator mode); negative; refraction; night vision; Jell-O gelatin effect; motion blur; Sobel edge detection; cloth ripple; motion trailer; Laplacian edge detection; genie effect; lens flare; brighten; TV static/noise; god rays; darken; flipping tiles; Gaussian blur; colorize; video on polygons; depth of field; remove color channels and mesh deformations.

Figure 7A:
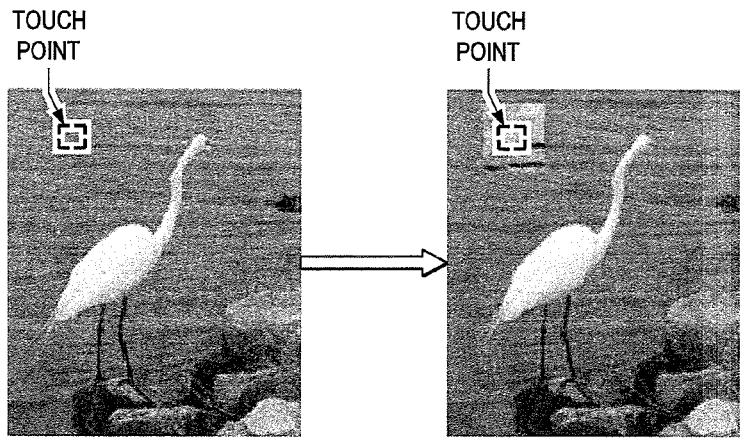
FIGS. 7A and 7B illustrate feedback effects provided in response to user touches on an image in accordance with an illustrative embodiment of the present disclosure.
Figure 7B:
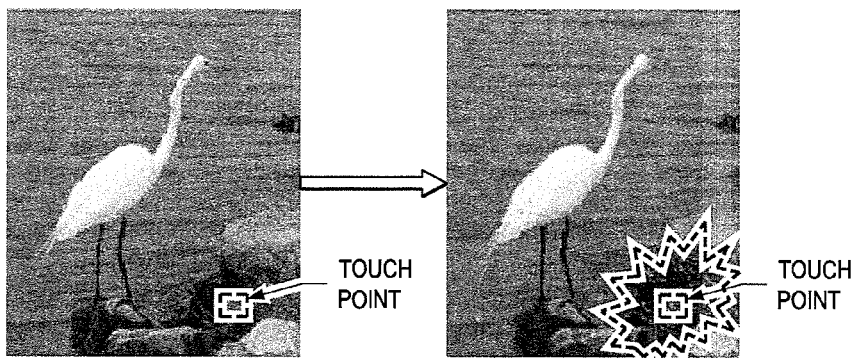

Various embodiments of the present disclosure also provide haptic feedback effects. The haptic feedback effects may involve a vibrotactile feedback generated using a coreless dc motor with asymmetric weights driven by an on-off switching circuit. The on-off switching software (e.g., immersion software) may provide a variety of switching sequences (e.g., vibration frequencies and patterns), each of which can be used to elicit a specific sensor response by the user touching the device. Any other software driven haptic/tactile feedback may also be used. In one illustrative example, when a user touches an area on an image where water is present, such as illustrated in FIG. 7A, a soft and/or low frequency vibration may be played. In another example, when a user touches a rock, such as illustrated in FIG. 7B, a stronger and/or higher frequency vibration may be played.

Various embodiments of the present disclosure also provide audio feedback effects. For example, a sound may start playing as soon as the user touches the touch-sensitive screen. The specific sound played may be determined based on the values of the texture features associated with the touch point. In some examples, the sound may keep playing in a loop as long as the user is touching the screen. The sound played may change depending on the local texture feature or color values. For example, a playback speed, a sound intensity or a sound type of the sound may be changed.

In some examples, the playback speed can be computed as a function of the texture feature or color values of the pixel associated with the point at which the user is touching the image. The function used to map texture feature or color values to the sound playback speed can be arbitrary. As an example function, the playback speed, s, can be computed as $s=s*(f^d)$ where f is a multiplication factor and $d>=1$ is an integer value measuring a specific texture feature at the touch point. In the above exemplar, the speed, s, means that the sound is played with a speed that is s-times the normal speed. Note that the value d may be any monotonic or non-monotonic function of the image texture. In some examples, the intensity of the sound played can also be computed in a manner similar to the one used to compute the playback speed.

In some examples, similar to changing the playback speed or intensity of the sound, the type of sound played can also be changed based on the texture feature values at the touch point. Two different categories of sounds may be utilized—natural and synthesized. While the natural sounds are recorded using a microphone from a place where the sound is present in nature (e.g. a waterfall), the synthetic sounds are generated by specifying the audio waveform of the sound. An example of a synthetic sound would be a sampled sine waveform with a specific frequency. In other examples, a library of different types of sounds or words may be mapped to specific identified features. As one illustrative example, when a user touches an area on an image where water is present, such as illustrated in FIG. 7A, a soothing sound, such as water flowing may be played. In another example, when a user touches a rock, such as illustrated in FIG. 7B, a harsher sound, such as a crashing noise, may be played. In yet other examples, recordings of words for "water" or "rock" may be played. Such embodiments may be particularly useful in assisting with visually impaired persons and children learning vocabulary.

Figure 9:
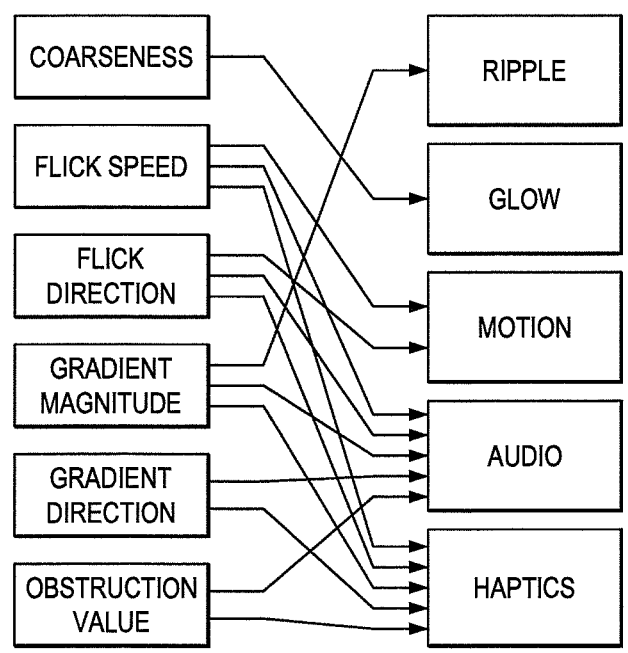
FIG. 9 illustrates an exemplary mapping between extracted image features and feedback effects in accordance with an illustrative embodiment of the present disclosure.

In various embodiments of the present disclosure, an effect may be modified based on the extracted image texture features. FIG. 9 illustrates an exemplary mapping between extracted image features and feedback effects in accordance with an illustrative embodiment of the present disclosure. In this illustrative embodiment, the system 200 determines the parameters of the feedback effects based on the underlying image texture as well as the way the user is touching the surface. In this illustrative embodiment, six main factors are used to modulate the feedback effects.

In this illustrative embodiment, the extracted coarseness value may be used to determine the size parameter of the glow effect. The greater the coarseness, the larger the size of the parameter. This association is based on the fact that textures with larger elements will require a user to focus on a larger region of the image as compared to a texture with smaller elements. To achieve this effect, the radius of the glow may be multiplied with the coarseness value which has been normalized based on the user preference. A general use of coarseness value could be to increase the size of the image region affected by the illumination type visual effect.

The flick speed is the speed with which the user moves his finger (or cursor) on the display. In this example, the flick speed is used to modulate the motion effect. The greater the speed, the greater the size of the motion blur or the size of any blur-type visual effect. The flick direction is the direction in which the user moves his/her finger (or cursor) on the display. In this example, the flick direction is also used to modulate the motion effect where the image is blurred only along the flick direction.

The Gradient magnitude is a value computed by convolving the image with the Sobel kernel associated with both the x and y directions. In one example, 3×3 Sobel kernels may be used for both the x and y directions. In this illustrative example, the gradient magnitude may be used to modulate the ripple effect. Since a higher value of gradient naturally should lead to greater dampening, the dampening factor may be multiplied with the gradient value. Thus, the ripples do not flow as fast in a region where there is a greater amount of gradients. Gradient value can, in general, be used to limit the amount of displacement in a displacement-type visual effect. Gradient direction is the direction associated with the gradient. In this illustrative example, the gradient direction is essentially used in determining the obstruction value as described below.

The obstruction value essentially determines the amount of gradient along the flick direction. Given a flick vector $(F_x, F_y)$ and the gradient vector $(G_x, G_y)$, the obstruction value is computed as the dot product of the flick vector and the gradient vector (i.e., $O=F_x*G_x+F_y*G_y$). In this illustrative example, the obstruction value, in turn, is used to modulate the audio and haptic effects. The greater the obstruction value, the greater the energy associated with eliciting the expected feedback. Energy in an audio or haptic effect could be associated with these characteristics, such as intensity and frequency.

Before these parameters are applied to the associated effects, their values can be modulated or modified according to user preferences. A machine learning system can also be designed to infer user preferences based on a user profile. The mapping illustrated in FIG. 9 is exemplary and not intended to imply any limitations on the number or type of different mappings that may be implemented in accordance with the principals of the present disclosure.

Figure 10:
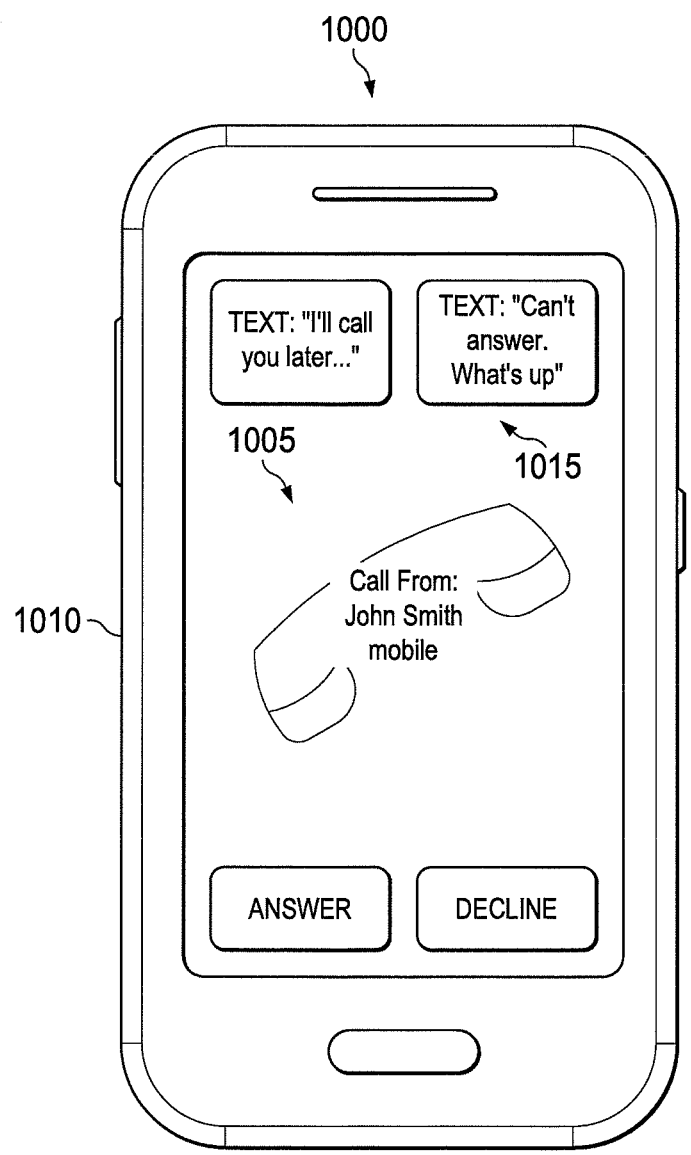
FIG. 10 illustrates an image displayed in a user interface for a mobile phone in accordance with an illustrative embodiment of the present disclosure.

FIG. 10 illustrates an image displayed in a user interface 1005 for a mobile phone 1000 in accordance with an illustrative embodiment of the present disclosure. In this illustrative embodiment, the mobile phone 1000 is one example of the electronic device 100 in FIG. 1. In this example, a touch screen 1010 of the mobile device 1000 displays an image 1015 (e.g., graphics of an incoming telephone call and user options) associated with an incoming call in the user interface 1005. The user interface 1005 also displays options for handling the call which include sending one of different options of text message responses, answering the call and declining the call.

In this illustrative embodiment, the system 200 has generated feedback effects for this image 1015 to assist the user in perceiving the image 1015 and aid in responding to the incoming call. For example, the user may be in a meeting or a watching a movie where constraints on hearing or viewing the mobile phone 1000 are present. In these examples, the mobile phone 1000 may provide haptic feedback to the user to assist in perceiving the image 1015 and aid in responding to the incoming call. For example, the user may touch the electronic device in one of the corners and feel a vibration indicating a selection of one of the options for handling the call. In one non-limiting example, touching an area of the image 1015 for answering the call may trigger feedback of a single short vibrotactile pulse, where touching "decline" triggers feedback of a single long vibrotactile pulse. Similarly, touching an area of the image 1015 for texting "I'll call you later . . . " may trigger feedback of two vibrotactile pulses, where touching texting "Can't answer. What's up" may trigger feedback of three vibrotactile pulses. The user is then informed which of the options for responding to the call the user has selected without needing to look at the mobile phone 1000 which may be advantageous in situations where the user cannot look at the mobile phone 1000. The vibrotactile pulse patterns associated with different texts may be obtained as parameters associated with differently textured images which may be shown as background images for the different text boxes.

As discussed above and illustrated by the example embodiment discussed above, the system 200 may also identify and factor in constraints 310 in generating feedback effect parameters for the image. Constraints 310 are limitations on the number and types of the modalities of the feedback effects that can be provided given, for example, physical constraints of the device displaying the image and environmental limitations, such as the user not being able to view the device (e.g., device in user's pocket, user is driving, user is visually impaired, etc.), noise being unacceptable in the current environment (e.g., a silent mode for the device) or the device not intended for touch (e.g., a computer monitor or television). The system 200 may identify these constraints from information about components in the device displaying the image (e.g., device not touch-screen enabled, does not include a haptic feedback device 175, does not include a speaker 130, etc.), settings of the device (e.g., device is in a silent mode of operation, a driving mode of operation, a no-display mode of operation, etc.) or may be identified automatically using the sensor 180, for example, through light or proximity detection (e.g., no light sensed or device is covered/blocked so visual feedback effects may be constrained).

Upon identification of the constraints 310, the system may limit the modalities of feedback provided with the image. For example, when a user is driving or visually impaired, the modalities of feedback provided with the image may be limited to haptic and audio feedback effects. In another example, when a user is in a meeting or a movie, the modalities of feedback provided with the image may be limited to haptic effects. In another example, when a user is presenting the image on a projector, television or uploading to a website, the modalities of feedback provided with the image may be limited to visual and audio feedback effects. In yet another example, feedback effects may be limited to haptic feedback effects when a doctor wants to feel a medical image so as to not miss observing any critical aberration.

These limitations may be included in advance of the display of the image and stored in association with the image for later display. For example, the system 200 may include different options for modalities of feedback provided for a displayed image in the event that one or more of the modalities of feedback are constrained at the time of display. In other examples, the system 200 may generate the feedback effects for the image based on identification of the constraints 310 identified at the time of display of the image.

Figure 11:
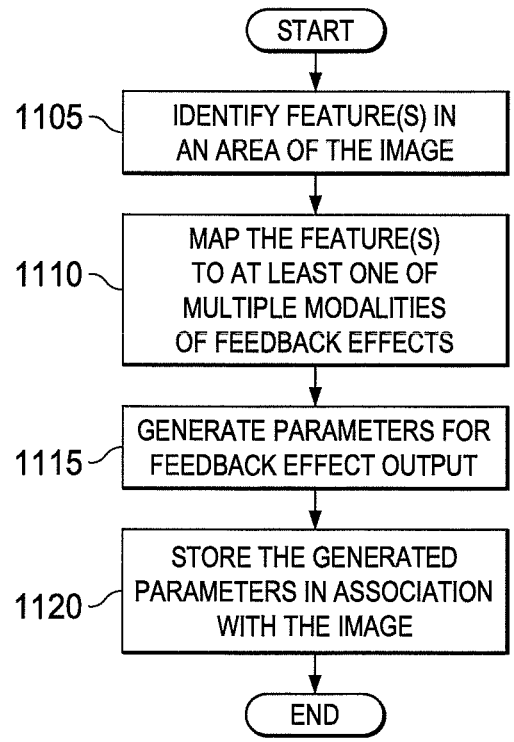
FIG. 11 illustrates a process for generating feedback effects for an image in accordance with various embodiments of the present disclosure.

FIG. 11 illustrates a process for generating feedback effects for an image in accordance with various embodiments of the present disclosure. For example, the process depicted in FIG. 11 may be performed by the electronic device 100 in FIG. 1 or the system 200 in FIG. 2.

The process begins by identifying feature(s) in an area of the image (step 1105). For example, in step 1105, the process may identify textures, intensity and colors associated with various areas of the image. The process may also identify objects present in the image. The features in the area may be extracted and identified based on a user interaction with the image, such as a touch or flick.

The process then maps the feature(s) to at least one of multiple modalities of feedback effects (step 1110). For example, in step 1110, the process may map the features in the image or the particular areas to different feedback effects to be provided. The multiple modalities of feedback effects may include one or more visual feedback effects, one or more haptic feedback effects and one or more audio feedback effects. As part of this step, the process may also identify constraints on which of the modalities of feedback effects can be mapped. The process may also map the feedback effects based on the user interaction with the image, such as a flick direction or speed.

The process then generates parameters for feedback effect output (step 1115). For example, in step 1115, the process may generate the parameters to provide the feedback effect when or as the user interacts with the image through a touch or cursor. The process then stores the generated parameters in association with the image (step 1120). For example, in step 1120, the process may store the generated parameters such that, in response to coordinates of an input of a user corresponding to the area of the image, a user interface associated with the image is configured to provide at least one of the multiple modalities of feedback effects to the user. AS part of this process, the user may be able to modify the parameter values that are generated.

Figure 12:
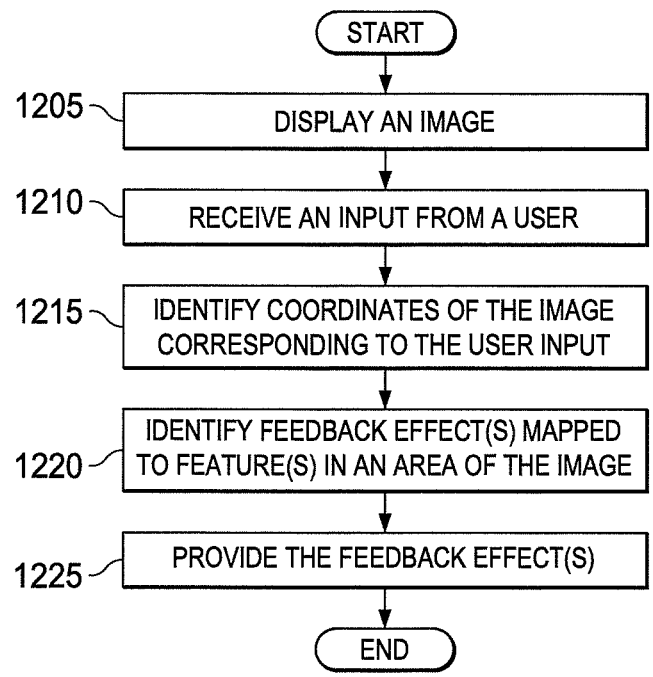
FIG. 12 illustrates a process for providing image feedback effects to a user in accordance with various embodiments of the present disclosure.

FIG. 12 illustrates a process for providing image feedback effects to a user in accordance with various embodiments of the present disclosure. For example, the process depicted in FIG. 12 may be performed by the electronic device 100 in FIG. 1 or the system 200 in FIG. 2.

The process begins by displaying an image (step 1205). For example, in step 1205, the process may display the image using a touchscreen-enabled device. The process then receives an input from a user (step 1210). For example, in step 1210, input may be through a touch of the touchscreen or a cursor of a mouse. The process then identifies coordinates of the image corresponding to the user input (step 1215). For example, in step 1215, the process may identify x and y coordinates of the touch or cursor position on the image. The process may also identify characteristics of the interaction with the image, such as flick direction and speed.

The process then identifies feedback effect(s) mapped to feature(s) in an area of the image (step 1220). For example, in step 1220, the process may generate feedback effects based on extracted features in the image that correspond to the user input. The process may also identify the feedback effects from a stored mapping between image areas or features and feedback effects. The feedback effects may include one or more visual feedback effects, one or more haptic feedback effects, and one or more audio feedback effects. As part of this step, the process may also identify constraints on the different types of feedback effects and limit which types of feedback effects are provided.

The process then provides the feedback effect(s) (step 1225). For example, in step 1225, the process may provide one or more visual feedback effects, one or more haptic feedback effects and/or one or more audio feedback effects in response to the detected user input.

Although FIGS. 11 and 12 illustrate examples of processes for generating feedback effects for an image and providing image feedback effects to a user, respectively, various changes could be made to FIGS. 11 and 12. For example, while shown as a series of steps, various steps in each figure could overlap, occur in parallel, occur in a different order or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing feedback effects for an image, the method comprising:
    identifying one or more features in an area of the image, wherein identifying the one or more features comprises:
        segmenting the image into a plurality of segments;
        identifying at least one feature of at least one point in each of the segments; and
        classifying each of the segments based on the identified at least one feature of each respective segment;
    mapping the one or more identified features to at least one of multiple modalities of feedback effects, wherein mapping the one or more identified features comprises mapping each of the segments to at least one of the multiple modalities of feedback effects based on the classification of each respective segment; and
    generating parameters for feedback effect output and storing the generated parameters in association with the image such that, in response to coordinates of an input of a user corresponding to the area of the image, a user interface associated with the image is configured to provide at least one of the multiple modalities of feedback effects to the user.

2. The method of claim 1, wherein the multiple modalities of feedback effects comprise one or more visual feedback effects, one or more haptic feedback effects, and one or more audio feedback effects.

3. The method of claim 1 further comprising:
displaying the image using a touchscreen enabled device;
identifying coordinates of the image corresponding to a touch input of the user;
identifying a feedback effect mapped to an area of the image; and
providing the feedback effect using the touchscreen enabled device.

4. The method of claim 1, wherein the one or more identified features comprise a texture, an intensity, and a color associated with the area of the image.

5. The method of claim 2 further comprising:
identifying a constraint on providing one or more of the multiple modalities of feedback effects to the user; and
constraining mapping of the one or more identified features to only unconstrained modalities of feedback effects.

6. The method of claim 5, wherein:
the constraint is a visually-impaired mode of operation, and
constraining mapping of the one or more identified features comprises constraining mapping of the one or more identified features to at least one of one or more haptic feedback effects or one or more audio feedback effects.

7. The method of claim 5, wherein:
identifying the constraint comprises identifying, using a sensor, that an amount of light is below a threshold, and
constraining mapping of the one or more identified features comprises constraining mapping of the one or more identified features to at least one of one or more haptic feedback effects or one or more audio feedback effects.

8. The method of claim 5, wherein:
the constraint is a silent mode of operation, and
constraining mapping of the one or more identified features comprises constraining mapping of the one or more identified features to at least one of one or more visual feedback effects or one or more haptic feedback effects.

9. A system for providing feedback effects for an image, the system comprising:
at least one processor;
at least one storage device configured to store program code;
wherein the processor is configured to execute the program code to:
identify one or more features in an area of the image;
map the one or more identified features to at least one of multiple modalities of feedback effects; and
generate parameters for feedback effect output and store the generated parameters in association with the image such that, in response to coordinates of an input of a user corresponding to the area of the image, a user interface associated with the image is configured to provide at least one of the multiple modalities of feedback effects to the user,
wherein to identify the one or more features, the processor is further configured to execute the program code to segment the image into a plurality of segments, identify at least one feature of at least one point in each of the segments, and classify each of the segments based on the identified at least one feature of each respective segment, and
wherein to map the one or more identified features, the processor is further configured to execute the program code to map each of the segments to at least one of the multiple modalities of feedback effects based on the classification of each respective segment.

10. The system of claim 9, wherein the multiple modalities of feedback effects comprise one or more visual feedback effects, one or more haptic feedback effects, and one or more audio feedback effects.

11. The system of claim 9, wherein the processor is further configured to execute the program code to:
identify coordinates of the image corresponding to a touch input of the user;
identify a feedback effect mapped to an area of the image; and
provide the feedback effect using a touchscreen enabled device.

12. The system of claim 9, wherein the one or more identified features comprise a texture, an intensity, and a color associated with the area of the image.

13. The system of claim 10, wherein the processor is further configured to execute the program code to:
identify a constraint on providing one or more of the multiple modalities of feedback effects to the user; and
constrain mapping of the one or more identified features to only unconstrained modalities of feedback effects.

14. The system of claim 13, wherein:
the constraint is a visually-impaired mode of operation, and
the processor is configured to execute the program code to constrain mapping of the one or more identified features to at least one of one or more haptic feedback effects or one or more audio feedback effects.

15. The system of claim 13, wherein:
identifying the constraint comprises identifying, using a sensor, that an amount of light is below a threshold, and
the processor is configured to execute the program code to constrain mapping of the one or more identified features to at least one of one or more haptic feedback effects or one or more audio feedback effects.

16. The system of claim 13, wherein:
the constraint is a silent mode of operation, and
the processor is configured to execute the program code to constrain mapping of the one or more identified features to at least one of one or more visual feedback effects or one or more haptic feedback effects.

17. The system of claim 16, wherein the image is associated with a call being received, wherein different areas on the image correspond to different actions that can be taken in response to the call, and wherein the mapped feedback effects are haptic feedback effects indicating an action taken in response to a touch input from the user.

18. A non-transitory computer-readable medium embodying program code for providing feedback effects for an image, the computer-readable medium comprising program code for:
identifying one or more features in an area of the image, wherein the program code for identifying the one or more features comprises program code for:
segmenting the image into a plurality of segments;
identifying at least one feature of at least one point in each of the segments; and
classifying each of the segments based on the identified at least one feature of each respective segment;
mapping the one or more identified features to at least one of multiple modalities of feedback effects, wherein the program code for mapping the one or more identified features comprises program code for mapping each of the segments to at least one of the multiple modalities of feedback effects based on the classification of each respective segment; and generating parameters for feedback effect output and storing the generated parameters in association with the image such that, in response to coordinates of an input of a user corresponding to the area of the image, a user interface associated with the image is configured to provide at least one of the multiple modalities of feedback effects to the user.

19. The method of claim 1, further comprising:

identifying a gradient associated with the identified at least one feature for each of the segments, wherein mapping each of the segments to at least one of the multiple modalities of feedback effects based on the classification of each respective segment comprises, for at least one of the segments, basing an intensity of the at least one modality of feedback effect mapped to the at least one segment on a value for the gradient associated with the identified at least one feature at the coordinates of the input of the user.

20. The system of claim 9, wherein the processor is further configured to execute the program code to:

identify a gradient associated with the identified at least one feature for each of the segments, wherein to map each of the segments to at least one of the multiple modalities of feedback effects based on the classification of each respective segment wherein the processor is further configured to execute the program code to, for at least one of the segments, base an intensity of the at least one modality of feedback effect mapped to the at least one segment on a value for the gradient associated with the identified at least one feature at the coordinates of the input of the user.

* * * * *